March 20, 1956     C. W. REDEKER ET AL     2,738,981

HORSE SIMULATING TREADLE OPERATED VELOCIPEDE

Filed Jan. 28, 1955     2 Sheets-Sheet 1

INVENTORS
CARL W. REDEKER,
EUGENIE B. REDEKER,
BY

McMorrow, Berman & Davidson
ATTORNEYS.

March 20, 1956 C. W. REDEKER ET AL 2,738,981
HORSE SIMULATING TREADLE OPERATED VELOCIPEDE
Filed Jan. 28, 1955 2 Sheets-Sheet 2

INVENTORS
CARL W. REDEKER,
EUGENIE B. REDEKER,
BY
McMorrow, Berman & Davidson
ATTORNEYS.

2,738,981

HORSE SIMULATING TREADLE OPERATED VELOCIPEDE

Carl W. Redeker and Eugenie B. Redeker, Oklahoma City, Okla.

Application January 28, 1955, Serial No. 484,686

3 Claims. (Cl. 280—1.203)

The present invention relates to a velocipede, and in particular to one simulating the body of a horse, and having a treadle operated driving mechanism.

The primary object of the present invention is to provide a driveable velocipede simulating the body of a horse and one having a pleasing appearance attractive to children.

Another object of the present invention is to provide a velocipede simulating a horse and having a treadle operated driving mechanism operated by a child using both feet simultaneously and with a rising and falling body motion similar to the movements of a person riding a horse at a speed greater than a walk.

A further object of the present invention is to provide a velocipede simulating a horse and one sturdy in construction, economical to manufacture and one highly effective in action.

These and other objects of the present invention will be fully apparent from the following description when taken in connection with the annexed drawings, in which.

Figure 1:
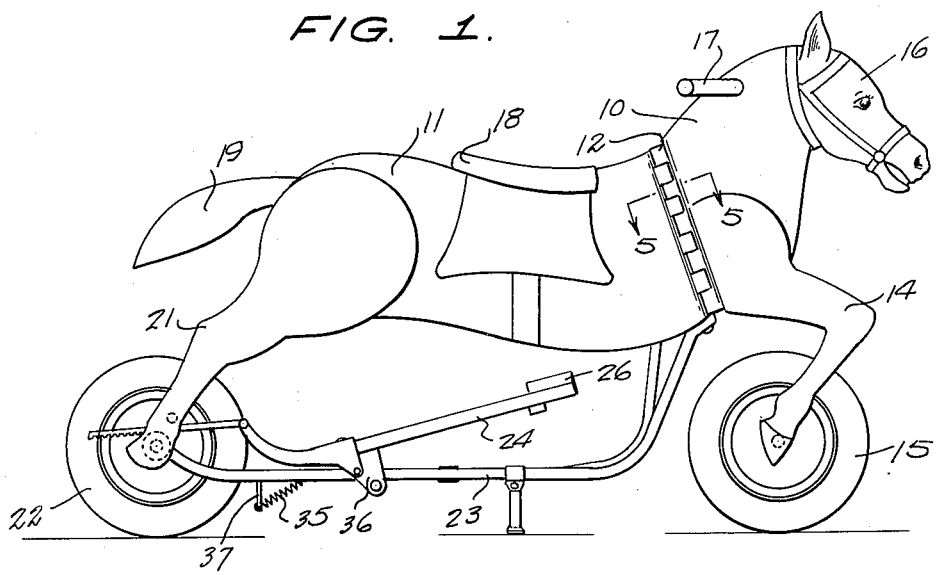
Figure 1 is a side view in elevation of the present invention.
Figure 2:
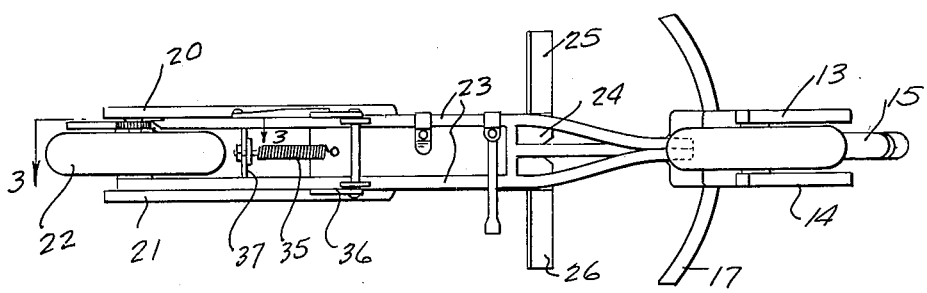
Figure 2 is a bottom view of the present invention.
Figure 3:
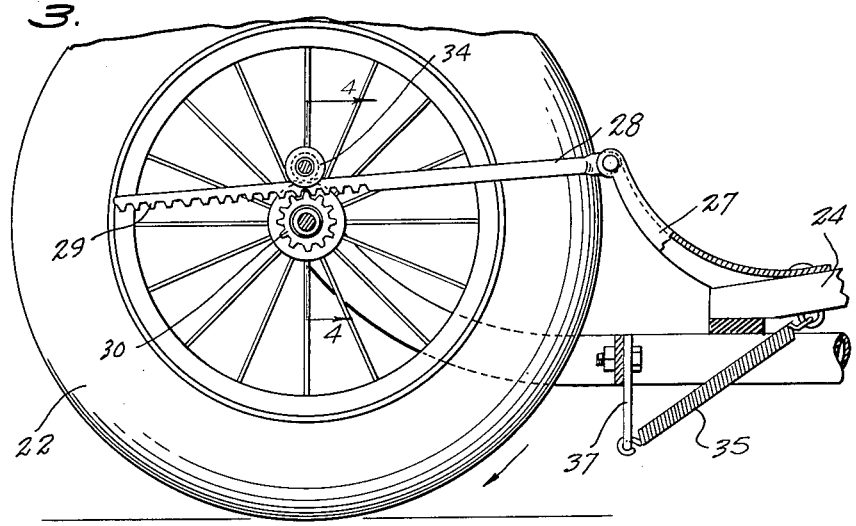
Figures 4, 5:
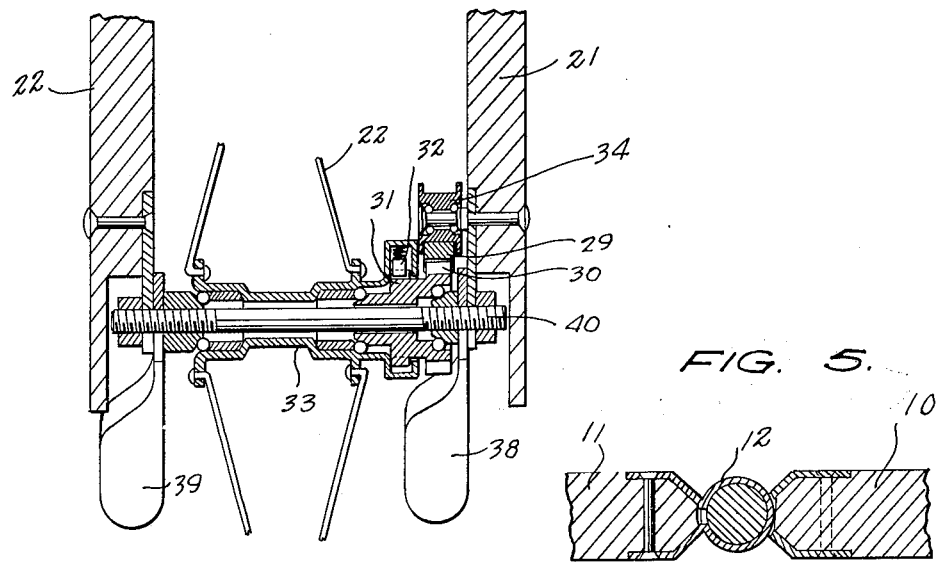

Figure 3 is a greatly enlarged detailed view partially in cross section on line 3—3 of Figure 2, Figure 4 is an end view partially in cross-section on line 4—4 of Figure 3, and Figure 5 is a detailed view in cross-section on line 5—5 of Figure 1.

Referring in greater detail to the drawing in which like numerals indicate like parts throughout the several views, the present invention consists of a treadle operated vehicle or velocipede comprising an upright frame having a fore section 10 and a rear section 11 hingedly connected together for movement about an upright axis, the hinge being indicated in Figure 1 and Figure 5 by the reference numeral 12.

The fore section includes a pair of forelegs disposed in side by side spaced relation, the forelegs being indicated in Figure 2 by the reference numerals 13 and 14, respectively, one on each side of a rotatable front wheel 15 carried by the forelegs for rolling movement over the ground.

A head is provided for the fore section, as indicated by the reference numeral 16 and a handlebar 17 extends transversely through the fore section immediately to the rear of the head. The rear section 11 includes a saddle 18, a tail 19, and a pair of hind legs 20 and 21 disposed in side by side spaced relation, as shown in Figure 2, and carrying between them a drive wheel 22 by means of which the velocipede of the present invention is driven in rolling movement over the ground.

A platform 23 is carried by the rear section 11 in an underslung position below the centers of the wheels 15 and 22 and carries in superimposed relation a treadle 24 having one end connected to the platform adjacent the rear end of the latter for pivotal movement of the other end upwardly and downwardly.

Foot rests 25 and 26 extend outwardly from the free end of the treadle 24 to provide means by which a child seated in the saddle 18 may pump the treadle downwardly.

An arm 27 extends upwardly and to the rear from the rear end of the treadle 24 and has its free end pivotally connected to the forward end of a bar 28, the other end of which is provided with a rack 29 engageable with the teeth on the gear 30, as shown in Figures 3 and 4.

The gear 30 is part of an overriding clutch assembly indicated in Figure 4 by the reference numeral 31 and includes spring biased dogs 32 carried in the hub 33 of rear wheel 22 for driving the wheel in the direction indicated by the arrow in Figure 3 upon downward movement of the treadle 24 and forward movement of the bar 28.

An idling wheel 34 is carried by the one leg 21 and keeps the rack 29 in meshing engagement with the teeth on the gear 30.

A spring 35 has one end connected to the rear end of the treadle 24 behind the bracket 36 which supports said treadle in superimposed spaced and pivotal relation with respect to the platform 23 and has its other end connected to a downwardly extending plate 37 secured to the rearwardly extending tubular member 38. Another tubular member 39, together with a tubular member 38, extend rearwardly from the platform 23 and with the hind legs 20 and 21 support the axle 40 on which rotates the hub 33 of the rear wheel 22. In use, a child may be seated upon the saddle 18 and may pump the treadle downwardly, during the execution of its downward movement the treadle drives the rear wheel 22 to propel the velocipede of the present invention in a rolling motion over the ground. The spring 35 will return the treadle to its upward position for the next pumping motion by the child, the overriding clutch assembly permitting free-wheeling between driving strokes of the treadle.

Steering is accomplished by the child with one hand on each end of the handle bar 17, the rearward slope of the hinge 12 permitting the front wheel 15 to assume its straight aligned position with respect to the drive wheel 22 upon release of the handlebar 17 or its return from a turning movement.

What is claimed is:

1. A treadle operated velocipede comprising an upright frame simulating the body of an animal, said frame embodying a fore section and a rear section hingedly connected together for movement about an upright axis, said fore section including a pair of forelegs disposed in side by side spaced relation, a rotatable front wheel positioned between and carried by said forelegs, said rear section including a pair of hind legs disposed in side by side spaced relation, a driveable rear wheel positioned between and carried by said hind legs, a platform carried by said rear section in an underslung position below the centers of said front and rear wheels, a treadle disposed in superimposed spaced relation with respect to said platform and having one end pivotally connected thereto for upward and downward movements about a horizontal axis, an arm extending upwardly from said treadle adjacent the rear end, a bar having one end pivotally connected to the upper end of said arm, and means operatively connecting the other end of said bar to said rear wheel for driving the latter upon execution by said treadle of its downward movement.

2. A treadle operated velocipede comprising an upright frame simulating the body of an animal, said frame embodying a fore section and a rear section hingedly connected together for movement about an upright axis, said fore section including a pair of forelegs disposed in side by side spaced relation, a rotatable front wheel positioned between and carried by said forelegs, said rear section including a pair of hind legs disposed in side by side spaced relation, a driveable rear wheel positioned between and carried by said hind legs, a platform carried by said rear section in an underslung position below the centers of said front and rear wheels, a treadle disposed in superimposed spaced relation with respect to said platform and having one end pivotally connected thereto for upward and downward movements about a horizontal axis, an arm extending upwardly from said treadle adjacent the rear end, a bar having one end pivotally connected to the upper end of said arm, and means operatively connecting the other end of said bar to said rear wheel for driving the latter upon execution by said treadle of its downward movement.

3. A treadle operated velocipede comprising an upright frame simulating the body of an animal, said frame embodying a fore section and a rear section hingedly connected together for movement about an upright axis, said fore section including a pair of forelegs disposed in side by side spaced relation, a rotatable front wheel positioned between and carried by said forelegs, said rear section including a pair of hind legs disposed in side by side spaced relation, a driveable rear wheel positioned between and carried by said hind legs, a platform carried by said rear section in an underslung position below the centers of said front and rear wheels, a treadle disposed in superimposed spaced relation with respect to said platform and having one end pivotally connected thereto for upward and downward movements about a horizontal axis, an arm extending upwardly from said treadle adjacent the rear end, a bar having one end pivotally connected to the upper end of said arm, means operatively connecting the said treadle to said rear wheel for driving the latter upon execution by the other end of said bar of its downward movement, and spring means biasing said treadle to its upward position.

References Cited in the file of this patent

UNITED STATES PATENTS

| | | | |
|---|---|---|---|
| D. 126,371 | Schnack | Apr. 8, | 1941 |
| 1,591,535 | Kimball | July 6, | 1926 |
| 1,604,888 | Dews | Oct. 26, | 1926 |
| 1,675,399 | Witherell et al. | July 3, | 1928 |
| 2,614,855 | Lolmaugh | Oct. 21, | 1952 |